United States Patent [19]

Blaney

[11] 4,355,607
[45] Oct. 26, 1982

[54] SAFETY DISENGAGEMENT DEVICE FOR AUTOMOTIVE SPEED CONTROL SYSTEM

[75] Inventor: Peter G. Blaney, Walnut Creek, Calif.

[73] Assignee: Zemco, Inc., San Ramon, Calif.

[21] Appl. No.: 185,352

[22] Filed: Sep. 8, 1980

[51] Int. Cl.³ .............................................. F02B 77/08
[52] U.S. Cl. .................................. 123/350; 123/351; 123/198 D; 180/170
[58] Field of Search ........... 123/350, 351, 352, 198 D; 180/170, 171, 176, 178, 179

[56] References Cited
U.S. PATENT DOCUMENTS

| 3,601,103 | 8/1971 | Swiden | 123/352 |
| 3,828,742 | 8/1974 | Weis | 123/351 |
| 4,171,030 | 10/1979 | Ruhl | 180/179 |
| 4,199,039 | 4/1980 | Ciemochowski | 123/351 |

FOREIGN PATENT DOCUMENTS

| 55-59023 | 5/1980 | Japan | 180/170 |
| WO79/01151 | 12/1979 | PCT Int'l Appl. | 180/179 |

Primary Examiner—Charles J. Myhre
Assistant Examiner—Andrew M. Dolinar
Attorney, Agent, or Firm—Owen, Wickersham & Erickson

[57] ABSTRACT

For use on an automotive vehicle equipped with an internal combustion engine and an automatic speed control system, a device for detecting accidental engine load removal and for providing disengagement of the speed control system to prevent an engine runaway condition. The device comprises a circuit that compares present engine speed with a previous engine speed furnished after a time delay to produce an output signal when a preselected engine speed differential occurs during the delay period. The output signal is utilized to disengage the speed control system directly or alternatively, to turn off the engine ignition system.

4 Claims, 2 Drawing Figures

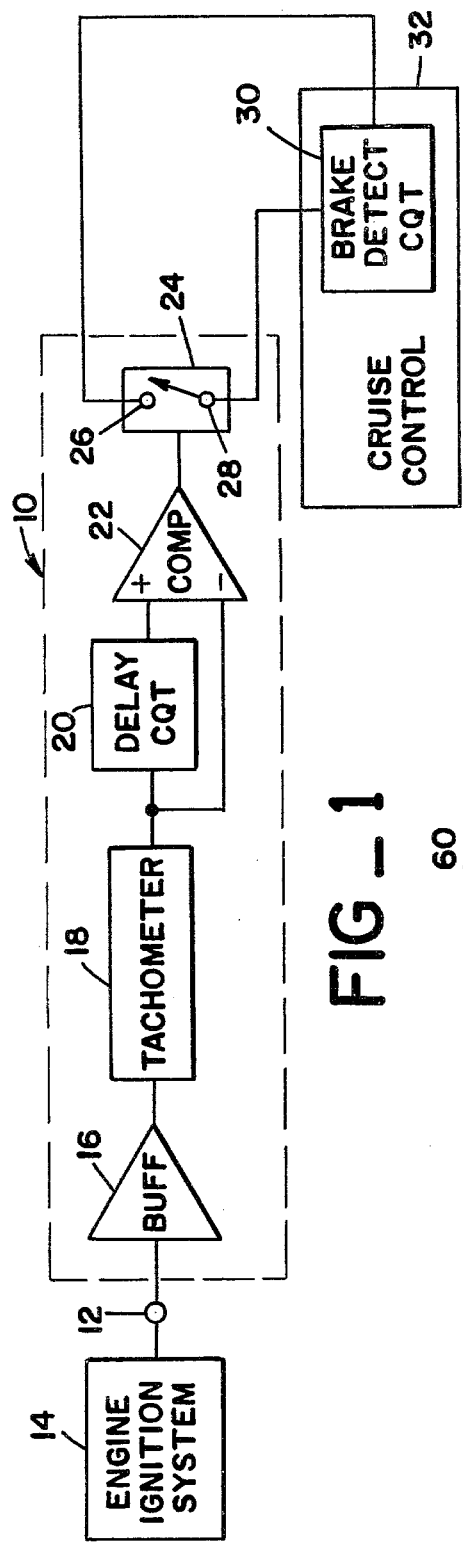
FIG_1
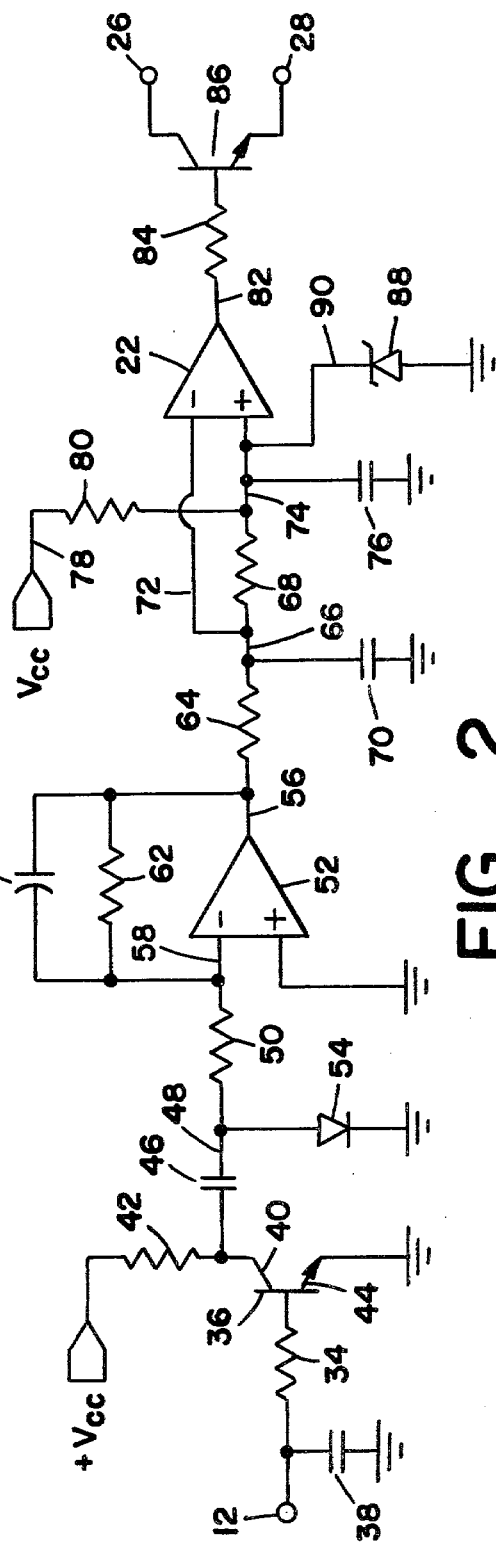
FIG_2

4,355,607

SAFETY DISENGAGEMENT DEVICE FOR AUTOMOTIVE SPEED CONTROL SYSTEM

BACKGROUND OF THE INVENTION

This invention relates to automotive speed control systems and more particularly to a device for automatically disconnecting such a system to prevent an engine overrun condition.

Automotive cruise control systems have been developed wherein a speed sensor supplies signals to an actuator for the engine throttle that provides variations which enable the vehicle to maintain a constant preselected speed. In order to adapt such a cruise control system to automobiles having a manual transmission, it was necessary to solve several problems. One serious problem which arose was that of preventing the engine from overrunning whenever the clutch was depressed while the cruise control was holding the throttle in an open position. Heretofore, the proposed solution to the problem was to supply a clutch disengagement switch which was positioned to be actuated by actual movement of the clutch mechanism and which provided a signal to disengage the cruise control when the clutch was depressed. Since there are a large number of different clutch and linkage arrangements for the many different automobiles in use, cruise control devices for the automotive aftermarket were required to provide several types of switches and brackets. This created the necessity to manufacture and stock a relatively large array of parts, which increased the cost to the consumer. An alternate approach would be to provide a universal type clutch switch, but this would require drilling holes in the vehicle and/or fabricating custom brackets, thereby complicating the installation procedure and again increasing costs.

For vehicles with automatic transmissions, a similar disengagement switch was heretofore required which was activated to turn off the cruise control when the shift selector was moved to neutral. However, this type of switch installation was also undesirable because of its cost and complexity.

An object of the present invention is to solve the aforesaid problem for both clutch and automatic transmission vehicles equipped with cruise control systems by providing a disengaging switch that does not require activation by either a clutch linkage or by linkage on an automatic transmission.

Another object of the invention is to provide, for a speed control system, an electronic device for automatically disengaging the speed control system after a preselected delay period following an inadvertant reduction in engine load.

Yet another object of the invention is to provide an electronic device for automatically disengaging an engine cruise control system in response to a change in engine load and moreover, a device that is readily adaptable to a wide range of vehicles, is easy to install, and is particularly adaptable for ease and economy of manufacture.

BRIEF SUMMARY OF THE INVENTION

The aforesaid and other objects of the invention are accomplished by a device which monitors the vehicle engine speed and provides a signal when a rapid rise in the engine speed occurs due to a sudden removal of engine load, as when the vehicle clutch is actuated or the automatic transmission is placed in neutral. The engine speed is monitored via a signal from the engine ignition system. An input buffer isolates the noisey high volrtage signal from all other low voltage circuits associated with the vehicle. A tachometer circuit converts the buffered pulses from the ignition system to a voltage proportional to engine speed. A delay circuit generates a reference which is the tachomoeter output delayed by a preselected time period. A comparator in the circuit monitors the tachometer output and the delayed reference. If the tachometer output is substantially greater than the delayed output (indicating that the engine speed is increasing rapidly), the comparator will be triggered and an output switch will be activated to disengage the cruise control or shut off the ignition system. The invention also provides for minimum and maximum engine speed detection to provide one more level of safety redundancy. A minimum speed detect signal will prevent the cruise control system from engaging if the input or tachometer portion of the circuit should become inoperative (i.e., the input lead is disconnected or is improperly installed). A maximum speed detect signal will disengage the cruise control if an engine overspeed condition somehow occurs without triggering the rate detection circuit.

Other objects, advantages and features of the invention will become apparent from the following detailed description of one embodiment thereof presented in conjunction with the accompanying drawing.

BRIEF DESCRIPTION OF THE DRAWING

FIG. 1 is a block diagram of the cruise control disengagement device according to the present invention; and FIG. 2 is a more detailed circuit diagram of a cruise control disengagement device according to the invention.

DETAILED DESCRIPTION OF EMBODIMENT

With reference to the drawing, FIG. 1 shows a block diagram of a safety disengagement device 10 according to the invention for use with an automotive speed control unit on a vehicle. The speed control unit, which is not shown, may be of the well known type wherein vehicle speed is monitored by a sensor on the engine drive shaft and the engine throttle is controlled to maintain a preselected speed. The present invention provides a means for quickly disengaging the speed control unit to prevent an engine overrun in case the vehicle clutch is inadvertantly disengaged or the automatic transmission is moved from a drive mode to neutral.

The input terminal 12 of the safety disengagement device is connected to the engine ignition system 14 to provide a means for monitoring engine speed. The relatively noisey, high voltage signal from the ignition system is fed through an input buffer 16 which isolates it from the rest of the low voltage circuits in the vehicle-/engine environment. The output from the buffer is fed to an electronic tachometer 18 which converts the buffered pulses from the ignition system to a voltage proportional to actual engine speed. Connected to the tachometer is a delay circuit 20 that generates a reference voltage which is the tachometer output delayed by a preselected time period. The output from the delay circuit is supplied as one input (negative) to a comparator 22. The output from the tachometer is also supplied to a second (plus) input terminal of the comparator. The comparator circuitry is such that if the tachometer output is substantially greater than the delayed output (indicating that the engine speed is increasing rapidly), the comparator will be triggered to provide an output signal to a switch 24 having contacts 26 and 28. These switch contacts may be connected to either a brake detect circuit 30 of the cruise control 32 (as shown) or to the engine ignition system, so that the comparator output signal will disengage the former or shut off the latter.

Turning to FIG. 2, one form of the cruise control disengagement device 10 according to the invention is shown in greater detail. Here, the primary ignition circuit of the vehicle is connected through an external series suppression resistor (not shown) to the input terminal 12, and the input terminal is connected through a resistor 34 to the base of a transistor 36 to provide its base drive current. The input terminal is also connected to one plate of a capacitor 38 whose other plate is connected to ground. The transistor 36 and the capacitor 38 comprise an input buffer. The collector 40 of transistor 36 is connected through a limiting resistor 42 to a positive power supply ($V_{cc}$), and its emitter 44 is connected to ground. The collector is also connected to one plate of a capacitor 46 whose other plate is connected via a lead 48, through a resistor 50 to the negative (virtual ground) input terminal of an operational amplifier 52 whose plus input terminal is connected to ground. Connected to the lead 48 between the capacitor 46 and the resistor 50 is one side of a diode 54 whose other side is connected to ground. The operational amplifier has a feedback circuit between its output lead 56 and an input lead 58 to its negative terminal comprised of a capacitor 60 in parallel with a resistor 62. The operational amplifier output lead 56 is connected to a resistor 64 which is connected in series by a lead 66 to another resistor 68. Connected to the lead 66 is one plate of a capacitor 70 whose other plate is grounded. The operational amplifier 52, together with its input elements, namely the capacitor 46, diode 54 and resistor 50, together with the output elements, resistor 64 and capacitor 70 (which provide a filtering function), all combine to provide the tachometer 18. Extending from the interconnecting lead 66 (the tachometer output) is a lead 72 attached to the negative input terminal of a comparator 22. The resistor 68 is connected in another lead 74 from the tachometer output to the plus input terminal of the comparator. Connected to this plus input lead is one plate of a capacitor 76 whose other plate is grounded. Also connected to input lead 74 is a lead 78 from the positive power supply $V_{cc}$ through a resistor 80. The resistor 68 and capacitor 76 form a delay which can be preset by selection of certain values for these elements.

The output of the comparator is furnished via a lead 82 through a resistor 84 to the base of a switching transistor 86. The collector of this transistor and its emitter are connected to the switch terminals 26 and 28 which in turn may be connected to the brake detect circuit of a typical cruise control system as described in FIG. 1.

Typical operation of the automatic cruse control disengagement system may be described as follows: the capacitor 38 connected from the input terminal 12 to ground serves to filter out high voltage transients and high frequency oscillations from the primary ignition circuit. Thus, a pulsing drive current is supplied to the base of the transistor 36. At each drive pulse a signal is furnished from the power source ($V_{cc}$) at the collector 40 which is a clean square wave with a frequency proportional to engine speed. During negative transitions of the input signal, transistor 36 is turned off and capacitor 46 is charged through resistor 42 and diode 54. During positive transitions of the input signal, transistor 36 is turned on and capacitor 46 is discharged through transistor 36 and resistor 50, since the negative terminal of operational amplifier 52 is a virtual ground node. Since capacitor 46 is discharged through resistor 50 once for each cycle of the input signal, the average current through resistor 50 is proportional to the input frequency.

The operational amplifier 52 with its feedback capacitor 60 and resistor 62 together form a single pole intergrator to average the current through the resistor 50 and provide an output voltage that is proportional to engine speed or, in other words, a tachometer output.

The resistor 64 and capacitor 70 connected to the output of the operational amplifier function together to reduce any ripple in the tachometer signal to a negligible level. This filtered tachometer signal connected to the negative input of the comparator is also furnished to the delay circuit 20 in the form of a second filter comprised of the resistor 68 and capacitor 76. This second filter serves to provide a reference to the positive input of comparator 22 which is delayed in time. The resistor 80 is connected to the positive voltage supply and to the positive input of the comparator, thereby providing a bias current through resistors 64 and 68 to offset the outputs of the first and second filter circuits. This offset becomes the threshold level for the comparator. The filtered tachometer signal supplied by the negative input in lead 72 to the comparator must exceed the delayed tachometer signal in its positive input 74 by the amount of the threshold offset in order to trigger the comparator output. This can only happen if the tachometer signal is rising at a rate (volts/second) faster than the threshold offsets (volts) divided by the delay time constant (seconds). In the design of the circuit the components are selected to provide a comparator output signal whenever the increase in engine speed is indicative of an overspeed condition, as when the clutch is inadvertently operated or the transmission is moved to neutral during operation of the cruise control system on the vehicle.

An output signal from the comparator supplied to the base of transistor 86 turns it "on" and thereby provides a disengagement signal through the output terminals 26 and 28 connected to the brake detect circuit of the cruise control.

An optional zener diode 88 to provide maximum RPM detection may be connected by a lead 90 to the positive input lead 74 to the comparator 22 between the capacitor 76 and the positive terminal of the comparator. This zener diode is selected to limit the maximum reference signal to the positive input to a preselected level. Thus, if the tachometer signal exceeds the limit provided by the zener diode, the comparator will be triggered and the cruise control disengaged as previously described.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A device for automatically disengaging a speed control system on a vehicle with an internal combustion gasoline engine having an ignition system, said device comprising: (1) an input buffer circuit adapted for connection to the vehicle ignition system for isolating ignition noise; (2) a tachometer circuit connected to said buffer circuit for generating a signal proportional to the vehicle engine speed; (3) a delay circuit connected to the output of said tachometer circuit for generating a signal proportional to the engine speed but delayed in time; (4) comparator means for comapring the tachometer circuit output to the delay circuit output and for producing a trigger signal whenever the tachometer signal exceeds the delayed signal by a preselected amount; and an output switch means connected to said comparator means for controlling the operation of the vehicle speed control system, whereby, whenever the comparator means is triggered, the output switch means will cause the speed control system to disengage.

2. The device of claim 1 includes a reference circuit connected to said comparator means for detecting when the vehicle engine speed exceeds a preselected maximum value and for triggering said output switch means to disengage the speed control whenever an engine overspeed condition occurs.

3. The device as described in claim 1 wherein said tachometer circuit comprises an operational amplifier that receives an input from said buffer circuit and provides an output with a voltage proportional to engine speed.

4. The device as described in claim 1 wherein said delay circuit comprises a resistor and a capacitor for providing a delayed output of said tachometer circuit with its output at a later predetermined time interval.

* * * * *